United States Patent
Parikh et al.

(10) Patent No.: US 10,282,546 B1
(45) Date of Patent: May 7, 2019

(54) SYSTEMS AND METHODS FOR DETECTING MALWARE BASED ON EVENT DEPENDENCIES

(71) Applicant: Symantec Corporation, Mountain View, CA (US)

(72) Inventors: Jugal Parikh, Mountain View, CA (US); Reuben Feinman, Mountain View, CA (US)

(73) Assignee: Symatec Corporation, Mountain View, CA (US)

( * ) Notice: Subject to any disclaimer, the term of this patent is extended or adjusted under 35 U.S.C. 154(b) by 298 days.

(21) Appl. No.: 15/188,950

(22) Filed: Jun. 21, 2016

(51) Int. Cl.
 *G06F 21/56* (2013.01)
 *G06N 3/08* (2006.01)
 *G06F 16/28* (2019.01)

(52) U.S. Cl.
 CPC .......... *G06F 21/566* (2013.01); *G06F 16/285* (2019.01); *G06N 3/08* (2013.01); *G06F 2221/033* (2013.01)

(58) Field of Classification Search
 None
 See application file for complete search history.

(56) References Cited

U.S. PATENT DOCUMENTS

| 8,195,582 B2* | 6/2012 | Niemasik | G06N 3/08 706/12 |
| 8,219,507 B2* | 7/2012 | Jaros | G06N 3/049 706/12 |
| 9,159,021 B2* | 10/2015 | Hawkins | G06N 3/049 |
| 9,996,694 B2* | 6/2018 | Sethumadhavan | G06F 21/552 |
| 2014/0165203 A1* | 6/2014 | Friedrichs | G06F 21/56 726/24 |
| 2015/0026027 A1* | 1/2015 | Priess | G06Q 40/00 705/35 |
| 2015/0096018 A1* | 4/2015 | Mircescu | G06F 21/56 726/23 |

(Continued)

OTHER PUBLICATIONS

Using neural nets to recognize handwritten digits; http://neuralnetworksanddeeplearning.com/chap1.html; as accessed on Jun. 9, 2016.

(Continued)

*Primary Examiner* — Farid Homayounmehr
*Assistant Examiner* — Olanrewaju J. Bucknor
(74) *Attorney, Agent, or Firm* — FisherBroyles, LLP

(57) ABSTRACT

The disclosed computer-implemented method for detecting malware based on event dependencies may include (1) applying, to a malware detection system capable of analyzing event dependencies, an event sequence derived from the execution of an application, (2) obtaining, from the malware detection system, a malware confidence score for the event sequence which the malware detection system calculates after a certain event within the event sequence has executed based at least in part on one or more dependencies between the certain event and at least one other event within the event sequence, (3) determining that the malware confidence score exceeds a threshold, and (4) classifying the application as malicious in response to determining that the malware confidence score exceeds the threshold. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2015/0254555 | A1* | 9/2015 | Williams, Jr. | G06N 3/0454 706/14 |
| 2016/0057159 | A1* | 2/2016 | Yin | H04L 63/145 726/23 |
| 2016/0292418 | A1* | 10/2016 | Wojnowicz | G06F 21/565 |
| 2017/0032243 | A1* | 2/2017 | Corrado | G06N 3/04 |
| 2017/0214701 | A1* | 7/2017 | Hasan | H04L 63/1408 |
| 2017/0230409 | A1* | 8/2017 | Ahmed | H04L 63/1441 |
| 2017/0316775 | A1* | 11/2017 | Le | G10L 15/16 |

OTHER PUBLICATIONS

Kolbitsch et al.; Effective and Efficient Malware Detection at the End Host; https://www.usenix.org/legacy/event/sec09/tech/full_papers/kolbitsch.pdf; accessed on Jun. 9, 2016.

Kapersky; http://usa.kaspersky.com/; as accessed on Jun. 9, 2016.

Malware Classification With Recurrent Networks; https://www.microsoft.com/en-us/research/publication/malware-classification-with-recurrent-networks/?from=http%3A%2F%2Fresearch.microsoft.com%2Fpubs%2F249072%2Fpascanuicassp2015.pdf; as accessed on Jun. 9, 2016.

A Beginner's Guide to Recurrent Networks and LSTMs; https://deeplearning4j.org/lstm.html; as accessed on Jun. 9, 2016.

Understanding LSTM Networks; http://colah.github.io/posts/2015-08-Understanding-LSTMs/; as accessed on Jun. 9, 2016.

Hacker's guide to Neural Networks; http://karpathy.github.io/neuralnets/; as accessed on Jun. 9, 2016.

Basic Neural Network Tutorial—Theory; https://takinginitiative.wordpress.com/2008/04/03/basic-neural-network-tutorial-theory/; as accessed on Jun. 9, 2016.

Intro to Neural Networks; https://www.youtube.com/watch?v=Dgs-UyRBQD4&feature=youtu.be; accessed on Jun. 9, 2016.

Chapter 6: Deep learning; http://neuralnetworksanddeeplearning.com/chap6.html; as accessed on Jun. 9, 2016.

NAND Gate; https://en.wikipedia.org/wiki/NAND_gate; as accessed on Jun. 9, 2016.

AND Gate; https://en.wikipedia.org/wiki/AND_gate; as accessed on Jun. 9, 2016.

OR Gate; https://en.wikipedia.org/wiki/OR_gate; as accessed on Jun. 9, 2016.

Event Computing; https://en.wikipedia.org/wiki/Event_(computing); as accessed on Jun. 9, 2016.

Neural Networks for Machine Learning; http://www.cs.toronto.edu/~tijmen/csc321/slides/lecture_slides_lec6.pdf; as accessed on Jun. 9, 2016.

Backpropagation; https://en.wikipedia.org/wiki/Backpropagation; as accessed on Jun. 9, 2016.

* cited by examiner

Event Sequence
210

| Time Step | EVENT | CONFIDENCE SCORE |
|---|---|---|
| 1 | PortalProcessInit | 0.0161017 |
| 2 | MutexCreate | 0.547025 |
| 3 | MutexCreate | 0.137796 |
| 4 | RegistryKeyCreated | 0.329661 |
| 5 | RegistryValueSet | 0.664676 |
| 6 | AutoPlayProgID | 0.899482 |
| 7 | AutoPlayProgID | 0.998297 |
| 8 | AutoPlayProgID | 0.999754 |
| 9 | RegistryKeyCreated | 0.931483 |
| 10 | RegistryValueSet | 0.398095 |
| 11 | RegistryKeyCreated | 0.322987 |
| 12 | RegistryValueSet | 0.472323 |
| 13 | RegistryKeyCreated | 0.106954 |
| 14 | RegistryValueSet | 0.150498 |
| 15 | RegistryKeyCreated | 0.0244787 |
| 16 | RegistryValueSet | 0.0148637 |

*FIG. 4*

Event Sequence
600

| Time Step | EVENT | CONFIDENCE |
|---|---|---|
| 1 | PortalProcessInit | 0.00106017 |
| 2 | RegistryKeyCreated | 0.000476226 |
| 3 | RegistryKeyCreated | 0.000369207 |
| 4 | RegistryValueSet | 0.000360378 |
| 5 | RegistryKeyCreated | 0.000321256 |
| 6 | RegistryValueSet | 0.000537232 |
| 7 | RegistryValueDeleted | 0.000657813 |
| 8 | RegistryValueDeleted | 0.000211924 |
| 9 | RegistryValueDeleted | 0.000177561 |
| 10 | RegistryValueDeleted | 0.000170646 |
| 11 | RegistryValueDeleted | 0.000175014 |
| 12 | RegistryValueSet | 0.000363719 |
| 13 | RegistryValueSet | 0.000328572 |
| 14 | RegistryValueSet | 0.000553929 |
| 15 | RegistryValueSet | 0.000520663 |
| 16 | DirectoryCreated | 0.000708034 |

*FIG. 6*

SYSTEMS AND METHODS FOR DETECTING MALWARE BASED ON EVENT DEPENDENCIES

BACKGROUND

Over the years, security solutions have attempted to combat the relentless onslaught of malware in a variety of ways. Early malware detection solutions rely on signature checking. However, while signature-based solutions may adequately identify known malware samples, malware authors may easily evade signature-based detection by changing a few lines of code or designing a program that mutates before each new attack. Responding to this, some newer malware-detection solutions rely on pattern-recognition technologies. These solutions may structurally analyze a program file's structure (e.g., by analyzing the file's binary code instruction sequences), thereby devising predictions prior to execution about the maliciousness of the files. However, malware authors may pack malware, making it difficult to inspect the structure of the malware, or may obfuscate malware to avoid structural classification engines.

Other newer malware-detection solutions rely on behavioral detection technologies to identify malware based on the behavioral features of a program in execution. Traditional behavioral detection technologies may use n-grams of behavioral events (e.g., a subsequence of n items derived from a given sequence, such as a sequence of API calls) to build statistical models for malware detection. However, malware authors may fool such behavioral detection technologies by creating minor system event re-orderings, thereby limiting the technologies' robustness. Accordingly, the instant disclosure identifies a need for improved systems and methods for accurately detecting malware.

SUMMARY

As will be described in greater detail below, the instant disclosure describes various systems and methods for detecting malware based on event dependencies. In one example, a computer-implemented method for detecting malware based on event dependencies may include (1) applying, to a malware detection system capable of analyzing event dependencies, an event sequence derived from the execution of an application, (2) obtaining, from the malware detection system, a malware confidence score for the event sequence which the malware detection system calculates after a certain event within the event sequence has executed based on one or more dependencies between the certain event and at least one other event within the event sequence, (3) determining that the malware confidence score exceeds a threshold, and (4) classifying the application as malicious in response to determining that the malware confidence score exceeds the threshold.

In one embodiment, the malware detection system may include a neural network. This neural network may include internal memory cell units that preserve information over time such that the neural network is capable of learning dependencies between events within event sequences being applied to the malware detection system. In some examples, the neural network may represent a Long Short-Term Memory (LSTM) network.

In one embodiment, the neural network may receive the certain event as input and, in response, output a hidden state vector for the event sequence at a moment in time representing the time at which the certain event executes. In this embodiment, the neural network may use the hidden state vector to calculate the malware confidence score. In some examples, the neural network may perform temporal max pooling over a sequence of hidden state vectors including the hidden state vector and a group of previous hidden state vectors for the event sequence at previous moments in time. In these examples, the neural network may use the pooled output resulting from the temporal max pooling to calculate the malware confidence score.

In one embodiment, the disclosed method may further include determining that the number of events included within the event sequence surpasses an allowable number. In this embodiment, the disclosed method may truncate the event sequence such that only a number of events within the event sequence that matches the allowable number are applied to the malware detection system.

In some examples, the disclosed method may further include terminating the application in response to determining that the malware confidence score exceeds the threshold. In one example, the disclosed method may terminate the application without executing one or more subsequent events within the event sequence.

In one embodiment, the disclosed method may further include applying, to the malware detection system, an additional event sequence derived from the execution of an additional application. In this embodiment, the disclosed method may determine, after a predefined number of events within the additional event sequence have executed, that none of the malware confidence scores outputted by the malware detection system for the additional event sequence exceed the threshold. In response to making this determination, the disclose method may classify the additional application as benign.

In some examples, the event sequence applied by the disclosed method may represent, without limitation, a system event, a network activity, a registry activity, a file activity, a process injection, and/or an API call. In one embodiment, the one or more dependencies between the certain event and at least one other event may include at least one dependency between the certain event and an event within the event sequence that is not adjacent to the certain event in the event sequence.

In one embodiment, the method may further include, prior to applying the event sequence to the malware detection system, training the malware detection system using binary sample labels. In some examples, the method may train the malware detection system via backpropagation to perform binary classification.

In one embodiment, a system for implementing the above-described method may include (1) an applying module, stored in memory, that applies, to a malware detection system capable of analyzing event dependencies, an event sequence derived from the execution of an application, (2) an obtaining module, stored in memory, that obtains, from the malware detection system, a malware confidence score for the event sequence which the malware detection system calculates after a certain event within the event sequence has executed based on one or more dependencies between the certain event and at least one other event within the event sequence, (3) a determination module, stored in memory, that determines that the malware confidence score exceeds a threshold, (4) a classification module, stored in memory, that classifies the application as malicious in response to the determination module determining that the malware confidence score exceeds the threshold, and (5) at least one physical processor configured to execute the applying module, the obtaining module, the determination module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) apply, to a malware detection system capable of analyzing event dependencies, an event sequence derived from the execution of an application, (2) obtain, from the malware detection system, a malware confidence score for the event sequence which the malware detection system calculates after a certain event within the event sequence has executed based on one or more dependencies between the certain event and at least one other event within the event sequence, (3) determine that the malware confidence score exceeds a threshold, and (4) classify the application as malicious in response to determining that the malware confidence score exceeds the threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4. is a block diagram of an exemplary event sequence that may be classified as malicious.

FIG. 6 is an additional block diagram of an exemplary event sequence that may be classified as benign.

Figure 1:
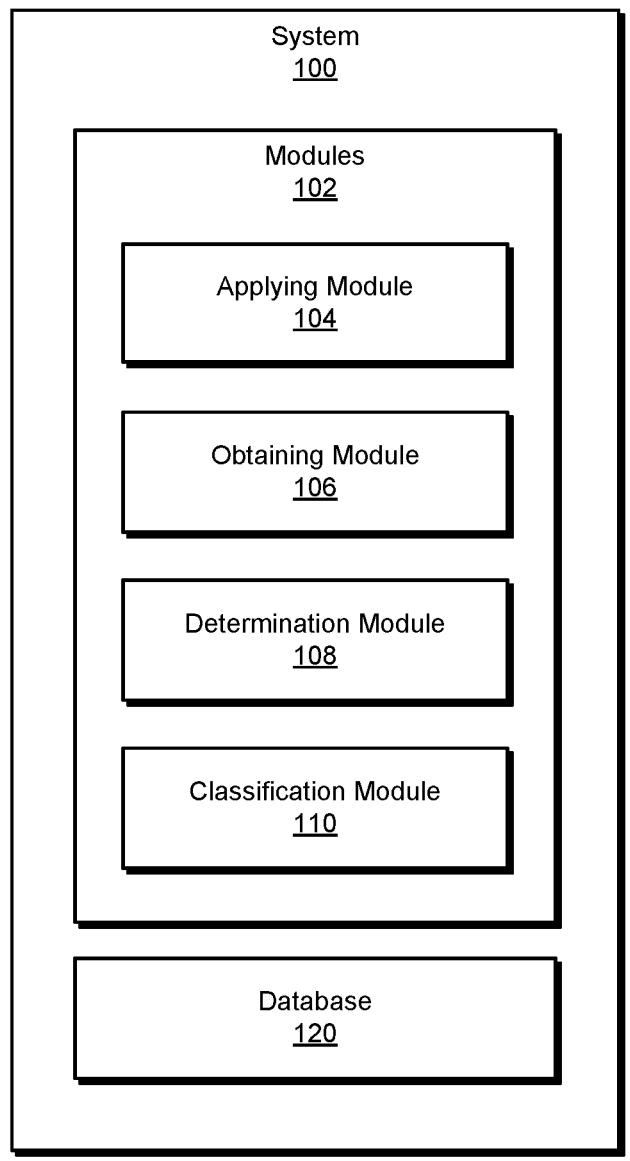
FIG. 1 is a block diagram of an exemplary system for detecting malware based on event dependencies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malware based on event dependencies. As will be explained in greater detail below, the disclosed systems and methods may provide a temporally-ingrained behavioral detection model for detecting malware using Long Short-Term Memory (LSTM) networks. In some examples, the disclosed model may process time-ordered sequences of data by coupling Recurrent Neural Networks (RNNs) with memory cell resources that preserve information over time. The information-persistence provided by the memory cell resources may allow the disclosed systems and methods to learn temporal dependencies between events, even when presented with large samples of sequential event data.

By applying an RNN that uses an LSTM architecture to malware problems, the disclosed systems and methods may facilitate determining whether a sequence of events is malicious based on the context of each event (e.g., the dependencies of each event), thereby achieving superior performance over traditional malware detection models (such as n-gram models, traditional RNNs, and/or echo state networks), which are not capable of taking such dependencies into account.

The following will provide, with reference to FIGS. 1-2, 4 and 6, detailed descriptions of exemplary systems for detecting malware based on event dependencies. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for detecting malware based on event dependencies. As illustrated in this figure, exemplary system 100 may include one or more modules 102 for performing one or more tasks. For example, and as will be explained in greater detail below, exemplary system 100 may include an applying module 104 that applies, to a malware detection system capable of analyzing event dependencies, an event sequence derived from the execution of an application. Exemplary system 100 may additionally include an obtaining module 106 that obtains, from the malware detection system, a malware confidence score for the event sequence which the malware detection system calculates after a certain event within the event sequence has executed based on one or more dependencies between the certain event and one or more other events within the event sequence. Exemplary system 100 may also include a determination module 108 that determines that the malware confidence score exceeds a threshold. Exemplary system 100 may additionally include a classification module 110 that classifies the application as malicious in response to determining that the malware confidence score exceeds the threshold. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., malware detection system 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information relating to applications and/or information relating to event sequences derived from executing applications. Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Figure 2:
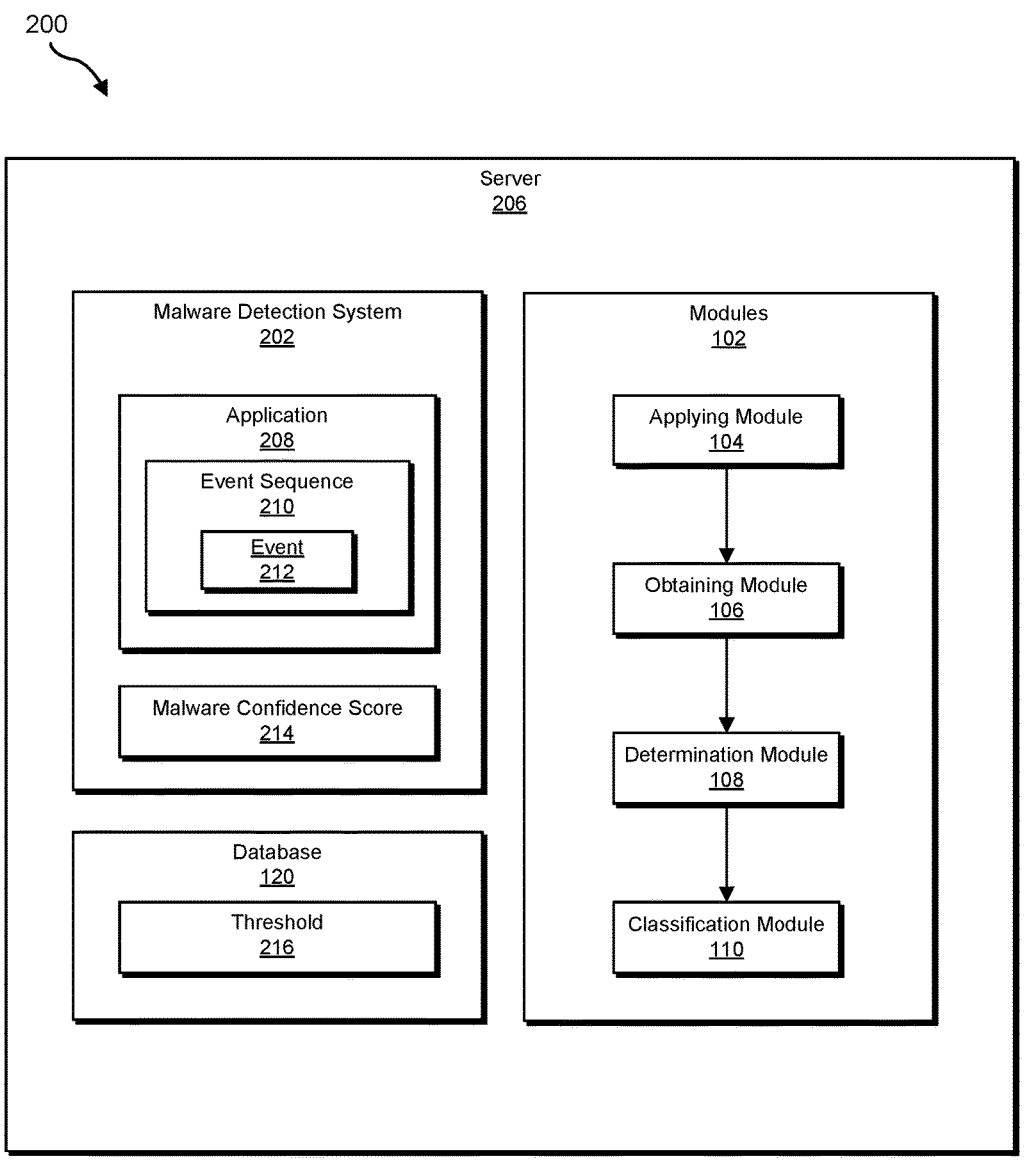
FIG. 2 is a block diagram of an additional exemplary system for detecting malware based on event dependencies.

Exemplary system 100 in FIG. 1 may be implemented in a variety of ways. For example, all or a portion of exemplary system 100 may represent portions of exemplary system 200 in FIG. 2. As shown in FIG. 2, system 200 may include a malware detection system 202 that operates as part of a server 206. In this example, server 206 may be programmed with one or more of modules 102 and/or may store all or a portion of the data in database 120.

In one embodiment, one or more of modules 102 from FIG. 1 may, when executed by at least one processor of malware detection system 202 and/or server 206, enable malware detection system 202 and/or server 206 to detect malware based on event dependencies. For example, and as will be described in greater detail below, applying module 104 may apply, to a malware detection system 202 capable of analyzing event dependencies, an event sequence 210 derived from the execution of an application 208. Obtaining module 106 may obtain, from malware detection system 202, a malware confidence score 214 for event sequence 210 which the malware detection system calculates based on one or more dependencies between an event 212 within event sequence 210 and at least one other event within event sequence 210. Determination module 108 may determine that malware confidence score 214 exceeds a threshold 216. Classification module 110 may classify application 208 as malicious in response to determining that malware confidence score 214 exceeds threshold 216.

Malware detection system 202 generally represents any type or form of computing system capable of detecting malware. In one example, malware detection system 202 may represent a neural network. As used herein, the term "neural network" generally refers to any type or form of programming model that enables a computer to automatically infer rules (e.g., rules for detecting malware) based on observational data. In some examples, the neural network may include a system of artificial neurons that provide an output (e.g., a malware classification) in response to receiving one or more weighted inputs. In some examples, the neural network may automatically tune the weights associated with the inputs in a training period during which one or more input patterns are applied to the neural network.

In one embodiment, malware detection system 202 may represent and/or include a Long Short-Term Memory (LSTM) Network. As used herein, the term "Long Short-Term Memory Network" generally refers to any type or form of neural network that includes internal memory cell units. As used herein, the term "internal memory cell unit" generally refers to any type or form of data structure used by an LSTM network that preserves information over time such that the LSTM network is capable of learning long-term dependencies.

In some examples, malware detection system 202 may include a multi-layer embedding layer that converts integer-coded events into numeric vectors. In these examples, the embedding layer may be followed by an LSTM layer that outputs hidden vectors sequences.

Server 206 generally represents any type or form of computing device that is capable of detecting malware. Examples of server 206 include, without limitation, application servers and database servers configured to provide various database services and/or run certain software applications. In some examples, server 206 may operate as part of a security service.

Figure 3:
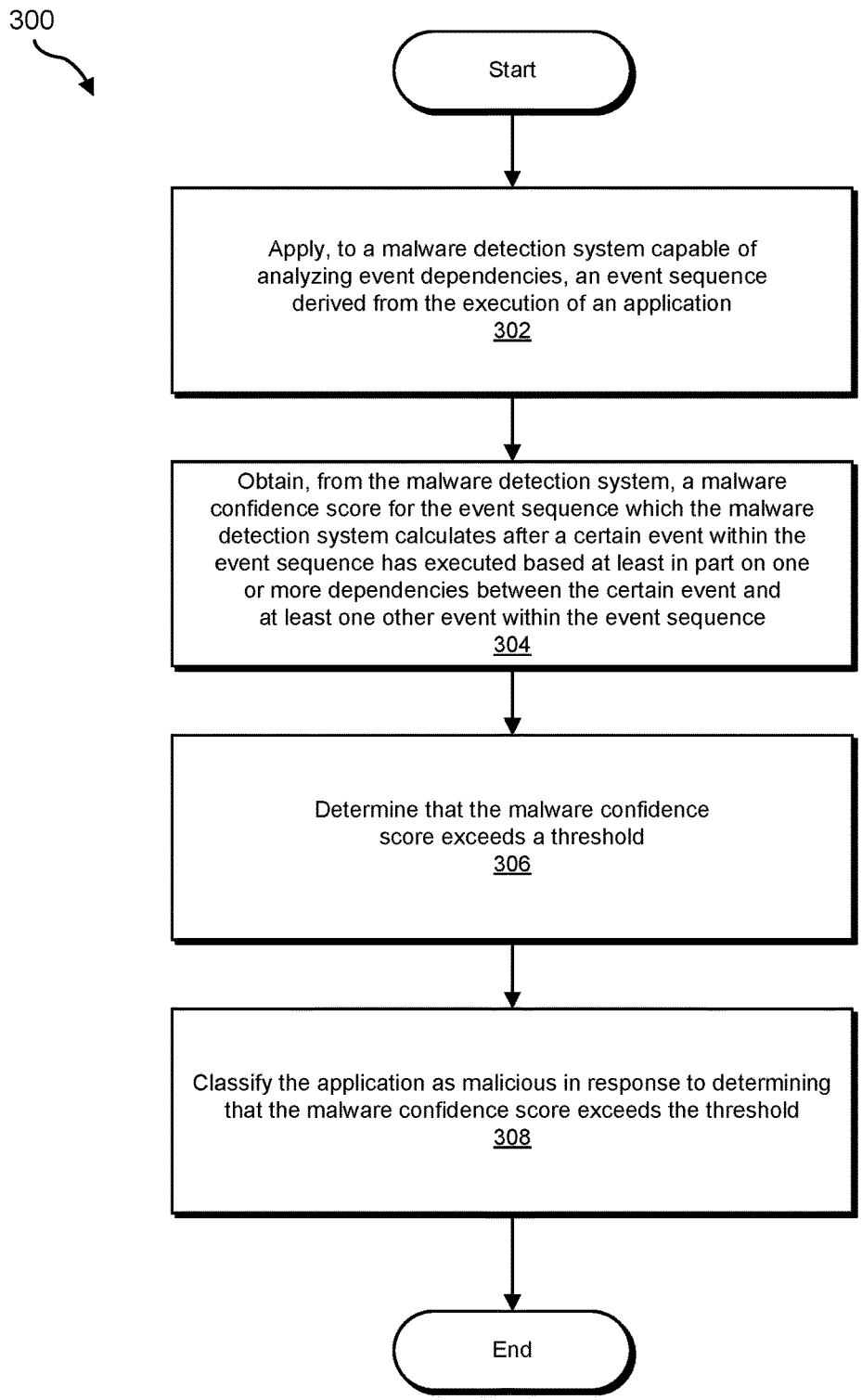
FIG. 3 is a flow diagram of an exemplary method for detecting malware based on event dependencies.

FIG. 3 is a flow diagram of an exemplary computer-implemented method 300 for detecting malware based on event dependencies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may apply, to a malware detection system capable of analyzing event dependencies, an event sequence derived from the execution of an application. For example, applying module 104 may, as part of server 206 in FIG. 2, apply, to malware detection system 202, event sequence 210 derived from the execution of application 208.

As used herein, the term "application" generally refers to any computer program that causes a computing system to perform useful tasks. As used herein, the term "event" generally refers to any type or form of digital behavioral action or occurrence that may be generated, detected, responded to, and/or handled by an application. Examples of an event may include, without limitation, a system event, a network activity, a registry activity, a file activity, a process injection, or an API call. The term "event sequence," as used herein, generally refers to a series of events that are invoked by an application when the application is executing.

As used herein, the term "event dependency" may refer to any type or form of relationship and/or correlation between two or more events within an event sequence. In some examples, an event may depend from another event if an observable interaction between the events occurs. In other examples, an event may depend from another event if the events occur within the same sequence (e.g., without a direct observable interaction occurring between the events). In these examples, an event may depend from another event based on the co-presence of the events and/or the relative position of the events within the sequence.

Applying module 104 may apply event sequence 210 to malware detection system 202 in response to a variety of events. In some examples, applying module 104 may apply event sequence 210 in response to receiving an instruction to evaluate whether application 208 is malicious. In one embodiment, applying module 104 may receive such an instruction from an administrator of server 206. In another embodiment, applying module 104 may receive the instruction from a threat-identification system (e.g., a system operating in connection with server 206) that is configured to identify and/or respond to unknown zero-day threats.

In some embodiments, a malware-detection policy may limit the number of events within an event sequence that malware detection system 202 is permitted to analyze. In these embodiments, applying module 104 may truncate event sequence 210 if the number of events included in event sequence 210 surpasses the number of events indicated in the malware-detection policy. To give a specific example, the malware-detection policy may indicate that malware detection system 202 may analyze, at most, two hundred events for a given event sequence. Thus, in this specific example, if event sequence 210 includes more than two hundred events, applying module 104 may truncate event sequence 210 such that events after the two hundredth event in the sequence will not be applied to malware detection system 202.

In one embodiment, applying module 104 may stop applying events within event sequence 210 to malware detection system 202 as soon as malware detection system 202 outputs a malware confidence score that surpasses threshold 216, as will be described in greater detail below. In other words, applying module 104 may apply events within event sequence 210 (e.g., as the events are executing) as long as the malware confidence scores outputted by malware detection system 202 for event sequence 210 fall below threshold 216.

In some embodiments, applying module 104 may, prior to applying event sequence 210 to malware detection system 202, have trained malware detection system 202 to detect malware. Applying module 104 may train malware detection system 202 in a variety of ways. In some examples, applying module 104 may train malware detection system 202 to perform binary classification. For example, applying module 104 may train malware detection system 202 to classify an application as malicious or benign (e.g., based on dependencies within events in an event sequence derived from executing the application).

In some examples, applying module 104 may train malware detection system 202 in a supervised manner (e.g., using binary sample labels). For example, applying module 104 may apply a series of training event sequences to malware detection system 202 along with a correct label (e.g., "malicious" or "benign") and/or a correct malware confidence score. In these examples, applying module 104 may, after applying the training event sequences to malware detection system 202, identify instances in which malware detection system 202 misclassifies training event sequences (e.g., by outputting a malware confidence scores that fall outside of an acceptable range of scores and/or correspond to an incorrect label).

In instances in which malware detection system 202 misclassifies a training event sequence, the disclosed systems and methods may improve the accuracy of malware detection system during the training stage by making one or more adjustments to malware detection system 202. The disclosed systems and methods may adjust malware detection system 202 in a variety of ways. In one example, the disclosed systems and methods may adjust malware detection system 202 via backpropagation. In this example, the disclosed systems and methods may calculate the gradient of a loss function with respect to the weights which were used by malware detection system 202 for the misclassified training event sequence.

In some examples, the disclosed systems and methods may define the loss function using cross-entropy. In these examples, the disclosed systems and methods may then feed the gradient to an optimization method (e.g., making use of an RMSprop learning rule), which may use the gradient to update the weights, thereby minimizing the loss function.

At step 304, one or more of the systems described herein may obtain, from the malware detection system, a malware confidence score for the event sequence which the malware detection system calculates after a certain event within the event sequence has executed based on one or more dependencies between the certain event and at least one other event within the event sequence. For example, obtaining module 106 may, as part of server 206 in FIG. 2, obtain, from malware detection system 202, malware confidence score 214 for event sequence 210.

A used herein, the term "malware confidence score" generally refers to a numerical value that indicates a probability of maliciousness. In one implementation, the malware confidence score may range from 0 to 1. In this implementation, a score of "1" may indicate a high confidence that an event sequence is malicious and a score of "0" may indicate a high confidence that the event sequence is benign.

Malware detection system 202 may calculate malware confidence score 214 in a variety of ways. In some examples, malware detection system 202 may create a series of updated malware confidence scores at various time steps (e.g., creating one updated malware confidence score at each time step). Each of these time steps may correspond to a time during which an event within event sequence 210 is executing. In these examples, malware detection system 202 may create malware confidence score 214 at a time step corresponding to the time at which event 212 is executing.

FIG. 4 provides a specific example of a series of malware confidence scores that malware detection system 202 outputs at various time steps while event sequence 210 is executing. FIG. 4 includes a list of sixteen time steps, each of which corresponds to a time during which a particular event within event sequence 210 is executing. As shown in FIG. 4, malware detection system 202 may calculate a new malware confidence score for event sequence 210 at each time step. In one example, event 212 may represent the event executed during the seventh time step in FIG. 4 (i.e., the event "AutoPlayProgID"). In this example, malware confidence score 214 may represent the value "0.998297."

In some examples, malware detection system 202 may include one or more internal memory cell units that preserve event information over time such that malware detection system 202 is capable of learning dependencies between events within event sequence 210. In one example, malware detection system 202 may control how information is preserved in the memory cells at a time step corresponding to event 212 using (1) a forget gate, which includes optimal gate parameters for selectively discarding previously-stored information (e.g., information obtained from previous time steps) from the memory cell, and (2) an input gate, which includes optimal gate parameters for selectively adding new information (e.g., information obtained from the time step corresponding to event 212) to the memory cell. In some examples, the optimal gate parameters may have been determined (e.g., by malware detection system 202) based on training examples applied to malware detection system 202 during a training stage.

The forget gates and input gates described above may allow malware detection system 202 to preserve, in its memory units, information that is potentially relevant to malware classification while disregarding information that is unlikely to be relevant to malware classification. In some instances, malware detection system 202 may use the preserved information to infer relevant dependencies between event 212 and one or more previous events within event sequence 210. In one example, these dependencies may represent long-term dependencies (e.g., dependencies between non-adjacent events).

In examples in which malware detection system 202 is capable of identifying event dependencies, malware detection system 202 may calculate malware confidence score 214 based on information describing one or more dependencies between event 212 and one or more other events that executed within event sequence 210 during previous time steps. In some such examples, malware detection system 202 may calculate a hidden state vector for event sequence 210 at the time step during which event 212 executed. In one embodiment, this hidden state vector may be calculated as a weighted combination of old memory cell states corresponding to previous time steps and new candidate values corresponding to event 212. As such, the disclosed hidden state vector may reflect one or more event dependencies between event 212 and previous events that executed during previous time steps within event sequence 210.

After malware detection system 202 calculates the hidden state vector for event sequence 210 at the time step during which event 212 executed, malware detection system 202 may calculate a final output (e.g., malware confidence score 214). In one example, an output gate included within malware detection system 202 may use inputs from the hidden state vector to calculate the final output.

In examples in which malware detection system 202 calculates malware confidence scores for event sequence 210 at a variety of time steps, malware detection system 202 may calculate malware confidence score 214 by performing temporal max pooling over a sequence of hidden state vectors that includes (1) the hidden state vector calculated at the time step corresponding to event 212 and (2) one or more previous hidden state vectors calculated at the previous time steps. In these examples, malware detection system 202 may calculate malware confidence score 214 using the pooled output resulting from the temporal max pooling. Thus, malware detection system 202 may use values from each hidden state vector within the sequence of hidden state vectors to calculate malware confidence score 214, instead of only using values from the hidden state vector calculated at the time step corresponding to event 212.

In some embodiments, malware detection system 202 may additionally base malware confidence score 214 on external information (e.g., weights and/or inputs that are not extracted directly from event sequence 210). For example, malware detection system 202 may additionally base malware confidence score 214 on an occurrence count of event sequence 210 and/or an occurrence count of a sub-sequence included within event sequence 210. In one example, a logarithm of an identified occurrence count for event sequence 210 may be used as a sample weight used in calculating malware confidence score 214.

Returning to FIG. 3, at step 306, one or more of the systems described herein may determine that the malware confidence score exceeds a threshold. For example, determination module 108 may, as part of server 206 in FIG. 2, determine that malware confidence score 214 for event sequence 210 exceeds threshold 216.

As used herein, the term "threshold" generally refers to a value that must be exceeded for a program to be classified as malicious. In some examples, determination module 108 may identify threshold 216 in a malware detection policy (e.g., a policy maintained by database 120). Additionally or alternatively, determination module 108 may receive threshold 216 via input from an administrator associated with server 206.

Determination module 108 may determine that malware confidence score 214 exceeds threshold 216 in a variety of ways. Using FIG. 4 as a specific example, determination module 108 may identify a malware confidence score outputted by malware detection system 202 at various time steps (i.e., time steps one through sixteen). Determination module 108 may also identify (e.g., from a policy) that threshold 216 corresponds to the value "0.9." Then, determination module 108 may determine (1) that at the seventh time step, malware detection system 202 has calculated the malware confidence score "0.998297" for event sequence 210 and (2) that the malware confidence value "0.998297" exceeds the threshold value "0.9." Thus, in the example illustrated by FIG. 4, determination module 108 may determine that the malware confidence score for event sequence 210 exceeds threshold 216 at the seventh time step.

Returning to FIG. 3, at step 308, one or more of the systems described herein may classify the application as malicious in response to determining that the malware confidence score exceeds the threshold. For example, classification module 110 may, as part of server 206 in FIG. 2, classify application 208 as malicious in response to determination module 108 determining that malware confidence score 214 exceeds threshold 216. Using FIG. 4 as a specific example, classification module 110 may classify application 208 as malicious at the seventh time step in response to determination module 108 determining that the malware confidence value "0.998297" exceeds the threshold value "0.9," as discussed above in connection with step 306.

In some examples, classification module 110 may perform one or more security actions upon classifying application 208 as malicious. In one embodiment, classification module 110 may send a notification to an administrator of server 206 indicating that application 208 has been flagged as malicious. Additionally or alternatively, classification module 110 may flag application 208 as malicious in a database such as database 120.

In examples in which malware detection system 202 calculates multiple malware confidence scores for event sequence 210 (e.g., one at each time step), classification module 110 may convict application 208 as soon as determination module 108 detects a malware confidence score that exceeds threshold 216. For example, classification module 110 may convict application 208 after a malware confidence score calculated for event sequence 210 exceeds threshold 216 for the first time. In these examples, classification module 110 may terminate application 208 immediately following the execution of event 212, without executing one or more subsequent events within event sequence 210.

Figure 5:
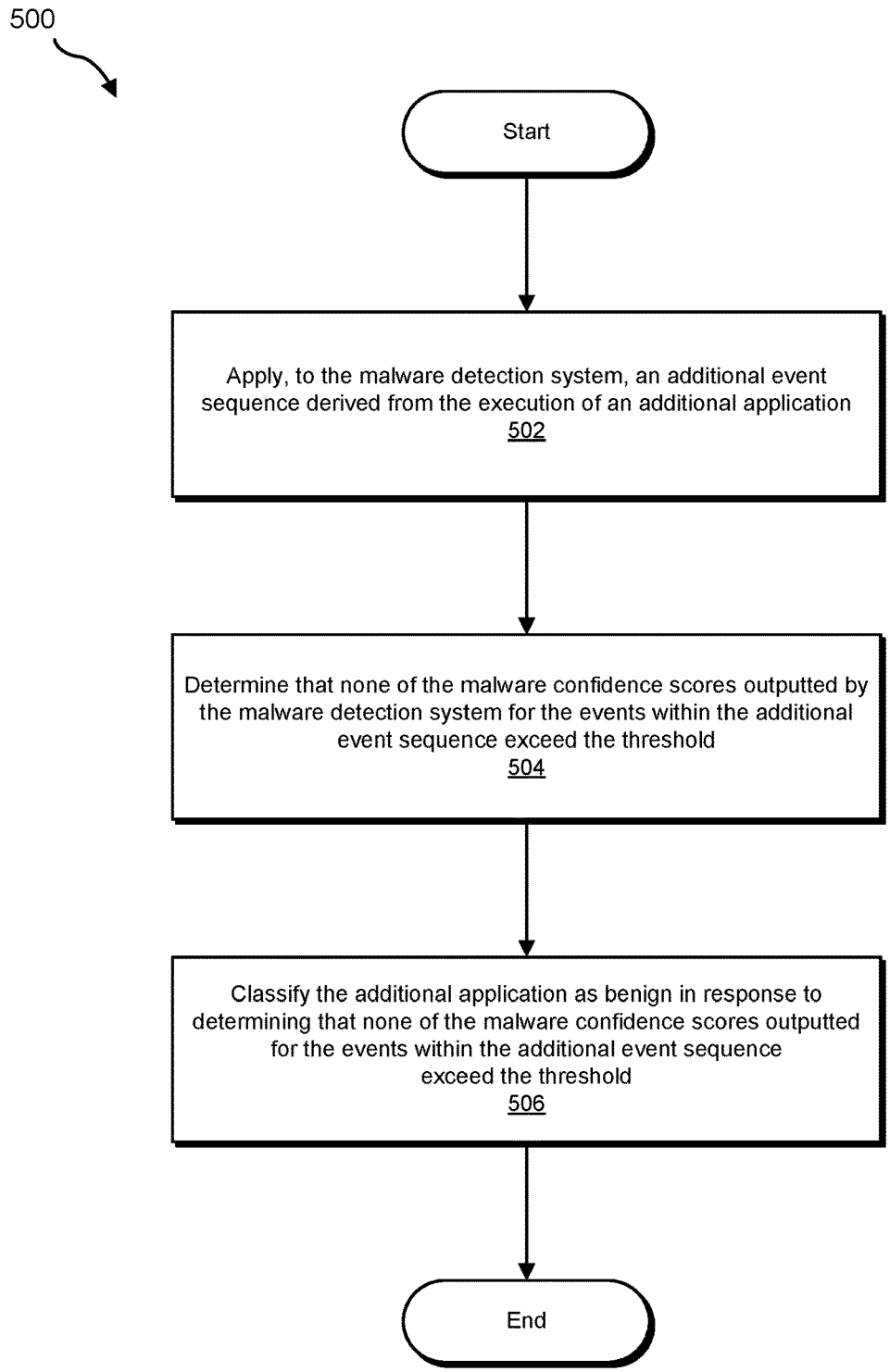
FIG. 5 is an additional flow diagram of exemplary method for detecting benign programs based on event dependencies.

In additional to analyzing application 208, the disclosed systems and methods may analyze an additional application to determine whether the additional application is malicious, as illustrated in FIG. 5. While FIG. 3 represents examples of a system and/or method in which an application is determined to be malicious, FIG. 5 represents examples of a system and/or method in which an application is determined to be benign. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 710 in FIG. 7, and/or portions of exemplary network architecture 800 in FIG. 8.

As illustrated in FIG. 5, at step 502, one or more of the systems described herein may apply an additional event sequence derived from the execution of the additional application to the malware detection system. Using FIG. 6 as a specific example, applying module 104 may apply an event sequence 600 derived from the execution of the additional application to malware detection system 202. Step 502 is similar to step 302 in FIG. 3, therefore, the discussion of step 302 may also apply to step 502.

Returning to FIG. 5, at step 504, one or more of the systems described herein may determine that after a predefined number of events within the additional event sequence have executed, none of the malware confidence scores outputted by the malware detection system for the events within the additional event sequence exceed the threshold. For example, determination module 108 may determine that, after a predefined number of events within the additional event sequence have executed, none of the malware confidence scores outputted by malware detection system 202 exceed threshold 216.

Determination module 108 may determine that none of the malware confidence scores for the additional event sequence exceed threshold 216 in a variety of ways. In some examples, determination module 108 may (1) identify the predefined number, (2) identify a value corresponding to threshold 216 and then (3) determine that none of the predefined number of malware confidence scores for the additional event sequence exceed the identified value.

First, determination module 108 may identify the predefined number. Determination module 108 may identify the predefined number in several ways. In one embodiment, determination module 108 may obtain the value from a policy. In some examples, the policy may dynamically define the predefined number as the number of events included within an event sequence currently being applied to malware detection system 202. In these examples, determination module 108 may wait until an entire event sequence has executed before determining that none of the malware confidence scores outputted for that event sequence exceed threshold 216.

In other examples, the policy may define the predefined number as a static number which may be smaller than the number of events included within an event sequence currently being applied to malware detection system 202. Using FIG. 6 as a specific example, the policy may have instructed applying module 104 to apply no more than sixteen events in any given event sequence to malware detection system 202. In these examples, determination module 108 may determine that none of the malware confidence scores for the additional event sequence exceed threshold 216 before the entire event sequence finishes executing (i.e., after the predefined number of events have executed).

Second, determination module 108 may identify the value corresponding to threshold 216. In some examples, determination module 108 may identify this value in a policy. Returning to FIG. 6 as a specific example, determination module 108 may determine that threshold 216 corresponds to the value "0.9."

Third, determination module 108 may determine that none of the predefined number of malware confidence scores for the additional event sequence exceed the identified threshold. Returning to FIG. 6 as a specific example once again, determination module 108 may determine that none of the malware confidence scored outputted by malware detection system 202 for event sequence 600 at time steps one through sixteen exceed the value "0.9." Step 504 is similar to steps 304 and 306 in FIG. 3, therefore, the discussion of steps 304 and 306 may also apply to step 504.

Returning to FIG. 5, at step 506, one or more of the systems described herein may classify the additional application as benign in response to determining that none of the malware confidence scores outputted for the additional event sequence exceed the threshold. For example, classification module 110 may classify the additional application as benign in response to determining that none of the malware confidence scores outputted by malware detection system 202 for the additional event sequence exceed threshold 216. Using FIG. 6 as a specific example, classification module 110 may classify the additional application as benign in response to determination module 108 determining that none of the malware confidence scored outputted by malware detection system 202 for event sequence 600 at time step one through time step sixteen exceed the value "0.9." Step 506 is similar to step 308 in FIG. 3, therefore, the discussion of step 308 may also apply to step 504.

As discussed above, the disclosed systems and methods provide a recurrent modeling approach to behavioral malware detection. In one embodiment, the recurrent model may use an LSTM architecture. In some examples, the LSTM architecture may include a recurrent layer that outputs a temporal sequence of hidden vector representations. In these examples, the disclosed systems and methods may apply temporal pooling over the recurrent layer outputs, thereby adding a fully-connected logistic regression layer over the pooled response.

In some examples, the disclosed systems and methods may include a supervised temporal feature development process during which the disclosed systems and methods train the LSTM network using sample labels. In one embodiment, the disclosed systems and methods may train the LSTM network via backpropagation using a cross-entropy loss function and an RMSprop optimization technique.

By applying potentially malicious event sequences to an LSTM network trained to classify malware, the disclosed systems and methods may evade vanishing gradient problems that plague traditional recurrent neural networks. As a result, the disclosed systems and methods may infer rich temporal patterns of behavioral event sequences which may be used for distinguishing between malicious and benign programs.

Figure 7:
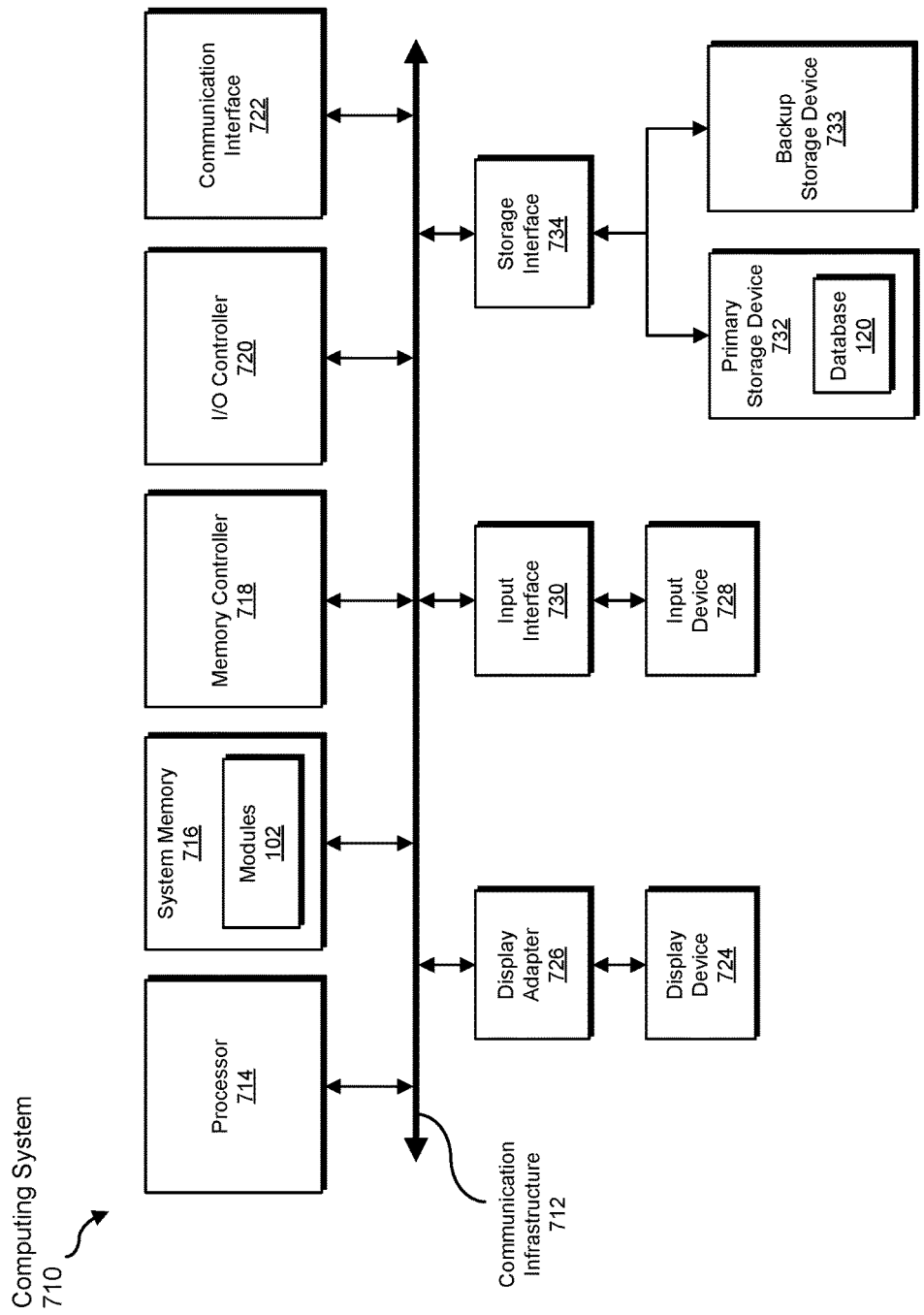
FIG. 7 is a block diagram of an exemplary event sequence computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
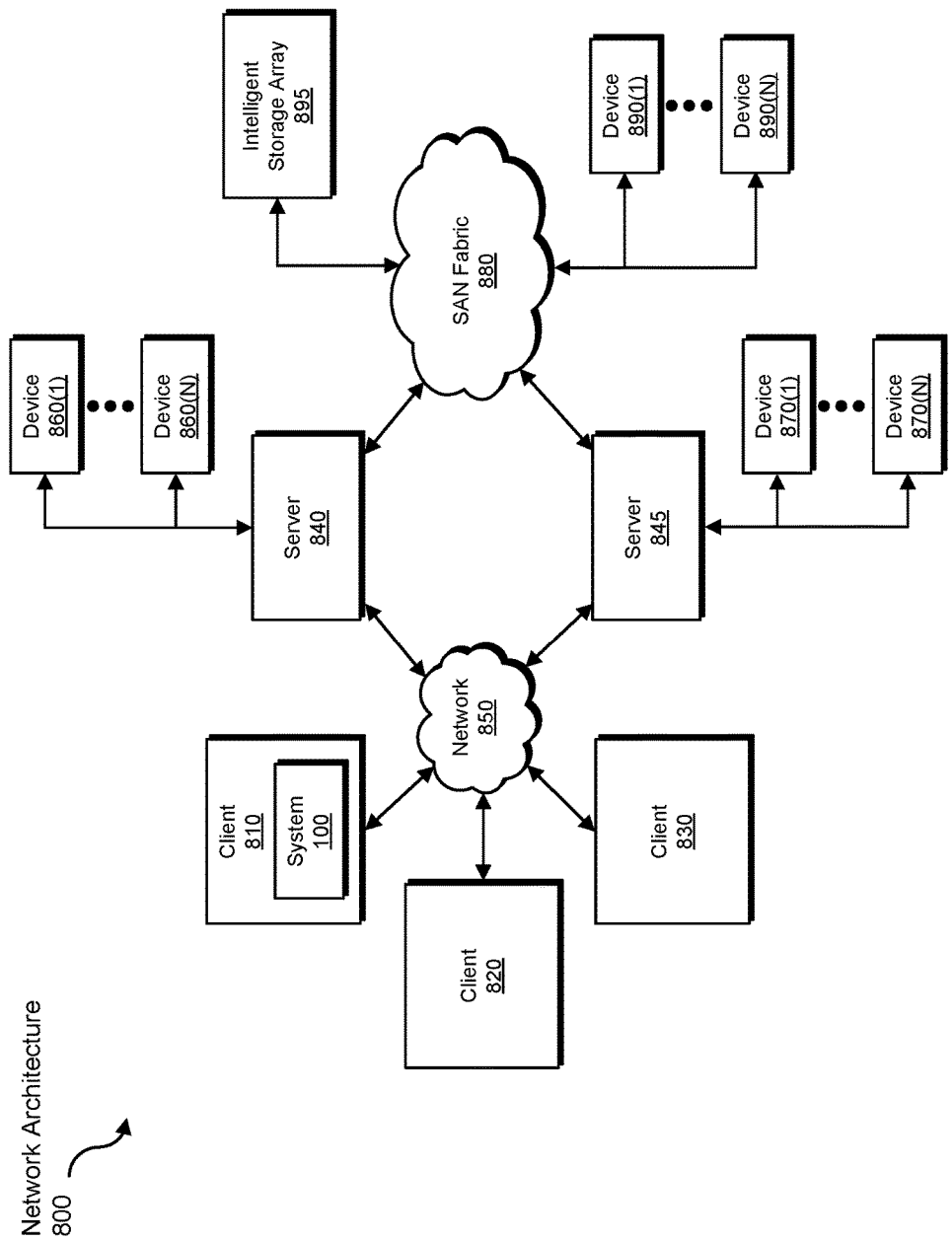
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for detecting malware based on event dependencies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive integer-coded events and transform the integer-coded events into numeric vectors. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware based on event dependencies, at least a portion of the method being performed by a computing device comprising at least one processor, the method comprising:
    applying, to a malware detection system capable of analyzing event dependencies, an event sequence derived from the execution of an application;
    obtaining, from the malware detection system, a malware confidence score for the event sequence which the malware detection system calculates after a certain event within the event sequence has executed based at least in part on one or more dependencies between the certain event and at least one other event within the event sequence, wherein the malware detection system calculates the malware confidence score by:
        receiving the certain event as input and, in response, outputting a hidden state vector for the event sequence at a moment in time representing the time at which the certain event executes;
        performing temporal max pooling over a sequence of hidden state vectors comprising the hidden state vector and a plurality of previous hidden state vectors for the event sequence at previous moments in time; and
        using the pooled output resulting from the temporal max pooling to calculate the malware confidence score;
    determining that the malware confidence score exceeds a threshold; and
    classifying the application as malicious in response to determining that the malware confidence score exceeds the threshold.

2. The computer-implemented method of claim 1, wherein the malware detection system comprises a neural network comprising internal memory cell units that preserve information over time such that the neural network is capable of learning dependencies between events within event sequences being applied to the malware detection system.

3. The computer-implemented method of claim 2, wherein the neural network represents a Long Short-Term Memory (LSTM) network.

4. The computer-implemented method of claim 1, wherein the malware detection system does not detect any observable interaction occurring between the certain event and the other event within the event sequence.

5. The computer-implemented method of claim 1, further comprising terminating the application without executing one or more subsequent events within the event sequence in response to determining that the malware confidence score exceeds the threshold.

6. The computer-implemented method of claim 1, further comprising:
    applying, to the malware detection system, an additional event sequence derived from the execution of an additional application;
    determining, after a predefined number of events within the additional event sequence have executed, that none of the malware confidence scores outputted by the malware detection system for the additional event sequence exceed the threshold; and
    classifying the additional application as benign in response to determining that none of the malware confidence scores outputted by the malware detection system for the additional event sequence exceed the threshold.

7. The computer-implemented method of claim 1, wherein
    the event sequence comprises at least one of:
    a system event;
    a network activity;
    a registry activity;
    a file activity;
    a process injection; and
    an API call.

8. The computer-implemented method of claim 1, further comprising, prior to applying the event sequence to the malware detection system, training the malware detection system using binary sample labels.

9. The computer-implemented method of claim 8, wherein training the malware detection system comprises:
    determining, while training the malware detection system, that the malware detection system has misclassified a training event sequence;
    using cross-entropy to calculate the gradient of a loss function with respect to one or more weights that were used by the malware detection system for the misclassified training event sequence; and
    using the gradient to update the weights.

10. The computer-implemented method of claim 1, wherein the one or more dependencies between the certain event and at least one other event comprises at least one dependency between the certain event and an event within the event sequence that is not adjacent to the certain event in the event sequence.

11. The computer-implemented method of claim 1, further comprising:
    determining that the number of events included within the event sequence surpasses an allowable number; and
    truncating the event sequence such that only a number of events within the event sequence that matches the allowable number are applied to the malware detection system.

12. A system for detecting malware based on event dependencies, the system comprising:
    an applying module, stored in memory, that applies, to a malware detection system capable of analyzing event dependencies, an event sequence derived from the execution of an application;
    an obtaining module, stored in memory, that obtains, from the malware detection system, a malware confidence score for the event sequence which the malware detection system calculates after a certain event within the event sequence has executed based at least in part on one or more dependencies between the certain event and at least one other event within the event sequence, wherein the malware detection system calculates the malware confidence score by:
  receiving the certain event as input and, in response, outputting a hidden state vector for the event sequence at a moment in time representing the time at which the certain event executes;
  performing temporal max pooling over a sequence of hidden state vectors comprising the hidden state vector and a plurality of previous hidden state vectors for the event sequence at previous moments in time; and
  using the pooled output resulting from the temporal max pooling to calculate the malware confidence score;
a determination module, stored in memory, that determines that the malware confidence score exceeds a threshold;
a classification module, stored in memory, that classifies the application as malicious in response to the determination module determining that the malware confidence score exceeds the threshold; and
at least one physical processor configured to execute the applying module, the obtaining module, the determination module, and the classification module.

13. The system of claim 12, wherein the malware detection system comprises a neural network comprising internal memory cell units that preserve information over time such that the neural network is capable of learning dependencies between events within event sequences being applied to the malware detection system.

14. The system of claim 13, wherein the neural network represents a Long Short-Term Memory (LSTM) network.

15. The system of claim 12, wherein the malware detection system does not detect any observable interaction occurring between the certain event and the other event within the event sequence.

16. The system of claim 12, wherein, prior to applying the event sequence to the malware detection system, the applying module trains the malware detection system using binary sample labels.

17. The system of claim 12, wherein the classification module terminates the application without executing one or more subsequent events within the event sequence in response to determining that the malware confidence score exceeds the threshold.

18. The system of claim 12, wherein the event sequence comprises at least one of:
  a system event;
  a network activity;
  a registry activity;
  a file activity;
  a process injection; and
  an API call.

19. A non-transitory computer-readable medium comprising one or more computer-readable instructions that, when executed by at least one processor of a computing device, cause the computing device to:
  apply, to a malware detection system capable of analyzing event dependencies, an event sequence derived from the execution of an application;
  obtain, from the malware detection system, a malware confidence score for the event sequence which the malware detection system calculates after a certain event within the event sequence has executed based at least in part on one or more dependencies between the certain event and at least one other event within the event sequence, wherein the malware detection system calculates the malware confidence score by:
    receiving the certain event as input and, in response, outputting a hidden state vector for the event sequence at a moment in time representing the time at which the certain event executes;
    performing temporal max pooling over a sequence of hidden state vectors comprising the hidden state vector and a plurality of previous hidden state vectors for the event sequence at previous moments in time; and
    using the pooled output resulting from the temporal max pooling to calculate the malware confidence score;
  determine that the malware confidence score exceeds a threshold; and
  classify the application as malicious in response to determining that the malware confidence score exceeds the threshold.

20. The non-transitory computer-readable medium of claim 19, wherein the malware detection system comprises a neural network comprising internal memory cell units that preserve information over time such that the neural network is capable of learning dependencies between events within event sequences being applied to the malware detection system.

* * * * *

UNITED STATES PATENT AND TRADEMARK OFFICE
CERTIFICATE OF CORRECTION

PATENT NO. : 10,282,546 B1
APPLICATION NO. : 15/188950
DATED : May 7, 2019
INVENTOR(S) : Jugal Parikh et al.

Page 1 of 1

It is certified that error appears in the above-identified patent and that said Letters Patent is hereby corrected as shown below:

On the Title Page

Item (73), delete "Symatec" and insert -- Symantec --, therefor.

Signed and Sealed this
Ninth Day of July, 2019

Andrei Iancu
*Director of the United States Patent and Trademark Office*